United States Patent
Price et al.

(10) Patent No.: US 7,431,060 B2
(45) Date of Patent: Oct. 7, 2008

(54) AUTOMATIC FIBER YIELD SYSTEM AND METHOD

(75) Inventors: John P. Price, Monticello, AR (US); Robert Stone, Jr., Crosby, MS (US)

(73) Assignee: The Price Companies, Inc., Monticello, AR (US)

(*) Notice: Subject to any disclaimer, the term of this patent is extended or adjusted under 35 U.S.C. 154(b) by 312 days.

(21) Appl. No.: 10/828,059

(22) Filed: Apr. 20, 2004

(65) Prior Publication Data

US 2005/0072494 A1   Apr. 7, 2005

Related U.S. Application Data

(60) Provisional application No. 60/508,195, filed on Oct. 2, 2003.

(51) Int. Cl.
   *B27L 1/00* (2006.01)
   *B23Q 15/00* (2006.01)

(52) U.S. Cl. ............... 144/340; 144/356; 144/394; 144/404

(58) Field of Classification Search .......... 144/340, 144/341, 208.1, 208.4, 208.5, 208.9, 357, 144/356, 391, 402–404, 382, 394; 198/571, 198/572

See application file for complete search history.

(56) References Cited

U.S. PATENT DOCUMENTS

| 5,005,621 | A | 4/1991 | Woodham |
| 5,020,579 | A | 6/1991 | Strong |
| 5,247,978 | A * | 9/1993 | Silenius et al. ............. 144/341 |
| RE37,460 | E | 12/2001 | Price et al. |
| 6,539,993 | B1 | 4/2003 | Starr |
| 6,546,979 | B2 | 4/2003 | Jonkka |

* cited by examiner

*Primary Examiner*—Shelley Self
(74) *Attorney, Agent, or Firm*—J. Charles Dougherty

(57) ABSTRACT

The present invention is a system and method for the automatic control of a debarking system for use in a chip mill, paper mill, or the like. The present invention comprises one or more programmable logic controllers (PLCs) that receive input from ultrasonic sensors that measure the quantity of wood present at various locations within the system. Based on this data, the PLCs reference look-up tables that contain information on start, stop, speed up, and slow down times for various system components based on such criteria as wood variety and season. The control system optimizes the fiber yield from the debarking system while also reducing mechanical wear on components of the system by reducing the time at which components are run at high speed.

16 Claims, 7 Drawing Sheets

| Table Number | 1 | 2 | 3 |
|---|---|---|---|
| PFC Infeed Delay (seconds) | 60 | 60 | 45 |
| PFC Delay to Stop (seconds) | 60 | 75 | 45 |
| PFC Infeed Sensor Depth (inches) | 12 | 12 | 15 |
| PFC Sensor Depth (inches) | 12 | 12 | 15 |
| Drum Slow Speed (rpm) | 6 | 8 | 10 |
| Drum Fast Speed (rpm) | 12 | 16 | 20 |
| Drum Delay to Slow (seconds) | 60 | 60 | 45 |
| Drum Delay to Stop (seconds) | 60 | 75 | 45 |
| DDC Slow Speed (feet/minute) | 100 | 80 | 150 |
| DDC Fast Speed (feet/minute) | 150 | 125 | 175 |
| DDC Delay to Slow (seconds) | 60 | 60 | 45 |
| DDC Delay to Stop (seconds) | 60 | 75 | 45 |
| DDC Sensor Depth (inches) | 12 | 12 | 15 |
| CFC Slow Speed (feet/minute) | 100 | 80 | 150 |
| CFC Fast Speed (feet/minute) | 150 | 125 | 175 |
| CFC Delay to Slow (seconds) | 60 | 60 | 45 |
| CFC Delay to Stop (seconds) | 60 | 75 | 45 |

Fig. 3

AUTOMATIC FIBER YIELD SYSTEM AND METHOD

This application claims priority based on U.S. provisional patent application No. 60/508,195, filed on Oct. 2, 2003 and entitled "Automatic Fiber Yield System and Method," which is incorporated herein by reference.

BACKGROUND OF THE INVENTION

The present invention relates to control systems for wood fiber processing machinery, and in particular to automatic controls for drum-based debarking machines that incorporate sensors and speed control mechanisms.

Debarking systems that incorporate rotating drums are known in the art. An example of such a system is taught by U.S. Pat. No. RE37,460 to Price et al., which is incorporated herein by reference. Such systems feature a large horizontal drum into which logs are inserted for debarking. The drum is fitted so as to rotate about its horizontal axis. As the drum rotates, the logs inserted within the drum rub against each other, thereby removing bark from the logs as they contact each other. The removal of bark is an essential step in the process of reducing logs to chips, which may ultimately be used in the manufacture of paper and other wood fiber products. Drum debarking may also be performed with respect to logs that are to be used for lumber.

An elevated, curved hopper is generally positioned at one end of the debarking drum, and the groups of logs to be debarked are fed into the drum using a chain-type conveyor. An auxiliary feed roller may be positioned between the chain conveyor and the drum to aid in the manipulation of longer logs through the rotating drum. A discharge conveyor is positioned on the outlet end of the rotating drum to receive debarked logs. In applications such as the creation of chips for the manufacture of paper, the material may then be feed to a chip mill conveyor for further processing of the raw wood fibers.

Conventional drum debarkers operate using simple manual controls. Before logs are to be fed into the debarker, the rotating drum and the chain conveyor are placed in the "on" position by the operator using a manual switch. In such systems, the conveyors and debarker drum are constantly in motion during operation. The speed of the conveyors, and the rate of rotation for the drum, is generally not variable. The conveyors and drum are not turned off until all of the logs and debris have moved through the system.

Simple manual operation of the debarking system has a number of disadvantages. The optimal rate of rotation for the debarking drum is determined, in part, by the number of logs within the drum at any given time. If, for example, the rate of rotation is too great for the number of logs present, then usable wood fiber material will be stripped from the logs after all bark is removed. The wood fiber lost in this manner cannot feasibly be separated from the removed bark, and thus is discarded as waste. Likewise, if the rate of rotation is too slow, then logs will be moved from the debarker without complete debarking having taken place. Since incomplete debarking is unacceptable, current practice is to simply run the debarking drum at a speed that will ensure debarking for any expected number of logs within the debarking drum at any given time. The result is wasted wood fiber material that is removed from the logs when the number of logs in the debarking drum would favor a lower speed.

The length of time that the logs remain in the debarking drum is also an important variable, which in a manual system is determined by the operator through visual inspection. If the operator leaves the logs in the drum for too long then material is wasted, but if the operator removes the logs too soon then they will have bark remaining and must be run through the debarking system a second time. Logs of varying quality and condition will require variances in the optimal debarking time. Wood variety and the season in which the debarking is performed are especially important factors in determining the optimal debarking time. Since logs of varying quality and condition will require different optimal debarking times, effective manual operation of a debarker requires considerable operator experience. Even with an experienced operator, however, the calculation of an optimal debarking time relies to some extent on guesswork. Training of a new operator requires a considerable amount of time since the new operator must obtain an intuitive feel for the nature of the logs in various conditions and in various seasons in order to operate a debarking system at acceptable efficiency.

Another disadvantage of the standard manual mode of operation for a debarking system is excessive wear on equipment. The operation of conveyors and debarking drums at full speed with no wood fiber present in the system causes friction and excessive wear of the machine components. These components are designed to operate best when material is present, but in a practical setting it is impossible to maintain an even and steady flow of material at all times during operation. An attempt to remedy this problem by constantly turning conveyors and the rotating drum off and on would also cause excessive wear of the machine components, since start-up and shutdown also causes considerable wear on the machinery. Furthermore, it would be exceedingly difficult for a human operator to constantly monitor the various components of a debarking system simultaneously and switch them on and off in an optimal manner as material moves through the system. Such a task would likely require multiple human operators.

The related art includes various attempts to develop automated control systems in the wood products industry. For example, U.S. Pat. No. 5,020,579 to Strong teaches an automatic feed control mechanism for a wood chipping machine. An infeed control circuit automatically adjusts infeed material capacity based on a load reading taken on the infeed conveyor. The control system automatically lifts a roller in the machine in order to clear jams, which are indicated by an infeed conveyor load reading that passes a certain pre-set value.

Another such device is taught by U.S. Pat. No. 6,539,993 to Starr. The system separates single logs, and then reads the diameter and volume of the logs in order to optimize debarking. A ring-style debarker is utilized. An "image" of each log is then taken, which allows an optimization of the log cutting length to be determined. Each log is then cut to length and sorted into bins of similar-length logs.

U.S. Pat. No. 6,546,979 to Jonkka teaches an automated method for controlling a drum-type debarker. This system utilizes information about both the weight of logs in the debarking drum and the rotational torque of the drum. This information is used to compute information concerning the average log density and top level of the log bunch tumbling within the drum. Alternatively, the drum weight information may be combined with optical sensing of drum filling degree in order to calculate average log density. Based on the information acquired in this manner, the system varies the speed of the drum rotation in an attempt to optimize the debarking operation. The infeed rate and discharge rate may also be varied to achieve the desired parameters. Jonkka teaches that reliance on the filling degree of the drum alone cannot produce satisfactory results in computing a proper debarking time.

The Jonkaa method offers advantages over manual control systems, but also suffers from important disadvantages. The calculations involved in this control system require precise measurement of the weight of material in the debarking drum as well as torque information related to the rotation of the debarking drum. These measurements require sensitive instruments, such as strain-gauge sensors and shaft transducers, the installation of which would involve substantial reworking of any existing debarking drum equipment already constructed. They would also substantially increase the cost of producing a new debarking drum. These limitations of the related art and others are overcome by the present invention as described below.

SUMMARY OF THE INVENTION

The present invention is directed to an automatic control system for a debarking apparatus that is designed to maximize wood fiber yield. The system may comprise three principal components. The first component is one or more programmable logic controllers (PLCs) or other computational elements. The PLCs control the operation of the conveyors and the debarking drum, in particular controlling the times at which these components may start, stop, speed up, or slow down.

The PLCs draw on data collected from look-up tables, preferably stored in an electronic or magnetic medium. These look-up tables include information pertaining to the speed and operational timing of conveyors and the debarker drum. No complex calculations in order to compute these numbers are thus required. The present invention accounts for variations in wood quality by the use of multiple sets of look-up tables. The different look-up tables may each reflect a number of factors that influence optimal system operation, such as the variety of wood and the season in which the wood is being milled.

The third component is one or more sensors that read information concerning the wood present at various points within the system. These sensors are preferably ultrasonic sensors, and may be used to detect the presence and quantity of material in a given location within the system. Preferably there are four locations at which such sensors are present: the drum feed conveyor, the debarking drum, the discharge conveyor, and the chipper feed conveyor. Using information gathered from these sensors, the PLCs access data at particular rows within the various look-up tables, and based on the data found the PLCs control the movements of the system conveyors and debarking drum.

The invention overcomes the limitations of the related art by achieving a near-optimum fiber yield system for chip mills and paper mills without the complexity of instrumentation required to perform calculations such as average density. Instead, empirical data pertaining to the load of wood being run is stored in look-up tables for simple and immediate access. All necessary information in order to perform the simple PLC calculations called for in the invention is available from the use of ultrasonic sensors, which can measure the quantity of material present at a given location at a given time.

It is therefore an object of the present invention to provide for an automatic control system and method to optimize fiber yields in debarking systems.

It is a further object of the present invention to provide for an automatic control system and method that does not rely on complex instrumentation or wood density calculations.

It is also an object of the present invention to provide for an automatic control mechanism that may be easily retrofitted to existing debarking systems.

It is also an object of the present invention to provide for an automatic control mechanism for debarking systems that simplifies operation of the debarking system.

These and other features, objects and advantages of the present invention will become better understood from a consideration of the following detailed description of the preferred embodiments and appended claims in conjunction with the drawings as described following:

DESCRIPTION OF THE SEVERAL VIEWS OF THE DRAWINGS

FIG. 3 is an illustration of example data in a group of look-up tables according to a preferred embodiment of the present invention.

DETAILED DESCRIPTION OF THE PREFERRED EMBODIMENTS

Figure 1:
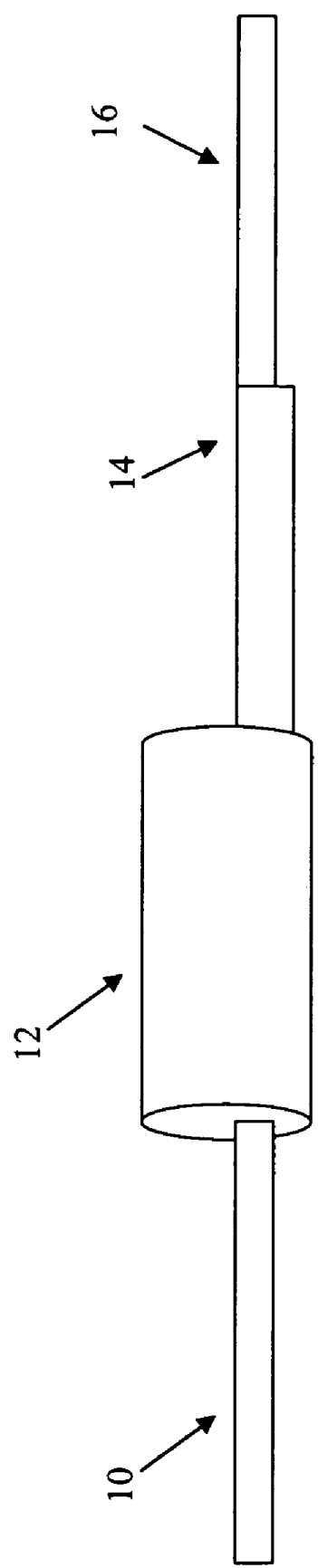
FIG. 1 is a side elevational view of the major mechanical components for a debarking apparatus according to a preferred embodiment of the present invention.
Figure 2:
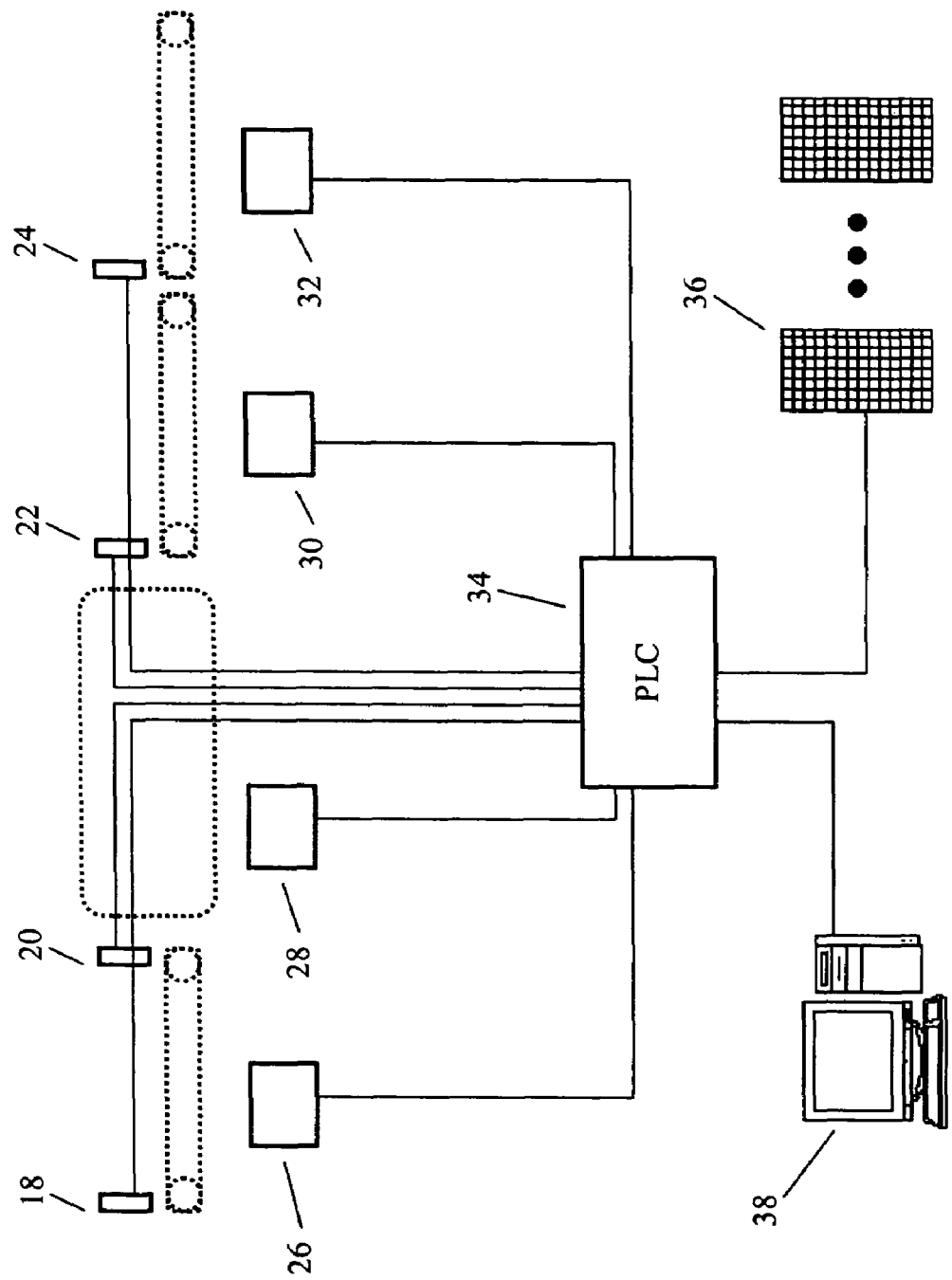
FIG. 2 is a diagram illustrating the control system components for a debarking apparatus according to a preferred embodiment of the present invention.

With reference to FIGS. 1 and 2, a debarking apparatus and control system according to a preferred embodiment of the present invention may now be described. The apparatus includes an infeed conveyor (alternatively referred to as a "positive feed" conveyor) 10, a rotating debarking drum 12, a discharge conveyor 14, and a chip feed conveyor 16. Infeed conveyor 10 is used to direct logs toward debarking drum 12. In the preferred embodiment, infeed conveyor 10 may be a chain conveyor of conventional type. Infeed conveyor 10 is driven by drive motor 26. Drive motor 26 (and the other drive motors described herein) may be of a conventional electric or hydraulic type in alternative embodiments. Logs may be fed into infeed conveyor 10 by an overhead crane, a forklift-type loader, or other means (not shown), and are carried by infeed conveyor 10 into debarking drum 12.

Debarking drum 12 is shaped as an open-ended cylinder, and is supported by a cradle of rollers 29 in horizontal fashion. Debarking drum 12 is driven by a variable speed motor 28, which causes it to rotate about its horizontal axis. The rotation of drum 12 causes logs fed into drum 12 from infeed conveyor 10 to rub against one another, and thereby results in the bark being removed from the logs as a result of the friction between the logs. Ideally, the logs are removed from debarking drum 12 just as all bark is removed so that the maximum amount of fiber will be retained in the logs for conversion to paper pulp or other desired wood fiber materials.

Logs emerging from debarking drum 12 are fed onto discharge conveyor 14. Like infeed conveyor 10, discharge conveyor 14 may preferably be a chain conveyor of conventional type, and is driven by motor 30. Discharge conveyor 14 feeds the debarked logs onto chip feed conveyor 16, which is driven by drive motor 32. Chip feed conveyor 16, which may also be of a conventional chain-conveyor type, may then feed the logs into a chip mill for ultimate use in wood pulp or for other applications. Although chip feed conveyor 16 may be omitted from the invention, it is included in the preferred embodiment since it is traditional for chip mills to use this additional conveyor. Any waste material that may exit debarking drum 12 and thereby travel up discharge conveyor 14 may be dropped in the gap between discharge conveyor 14 and chip feed conveyor 16. The use of chip feed conveyor 16 thereby improves the quality of the chip material that will eventually be produced from the logs since only a trivial quantity of waste material will find its way to the end of chip feed conveyor 16 in conjunction with the logs.

Ultrasonic sensors are positioned at key locations along the preferred embodiment of the invention, as depicted in FIG. 2. Infeed conveyor sensor 26 is positioned to sense material that is placed on infeed conveyor 10. Drum sensor 20 is positioned to sense material that is on infeed conveyor 10 just before entering debarking drum 12. Discharge conveyor sensor 22 is positioned to sense material that is at discharge conveyor 14, and chip feed conveyor sensor 24 is positioned to sense material that is at chip feed conveyor 16. In the preferred embodiment, discharge conveyor sensor 22 (as well as the other sensors described herein) are ultrasonic sensors model no. IRU-3135, manufactured by STI Automation of Logan, Utah. Other types of sensors could be used in alternative embodiments, including without limitation other models and brands of ultrasonic sensors as well as various types of optical sensors.

The major components of the control system of the preferred embodiment may now be described with continued reference to FIG. 2. The signals from infeed conveyor sensor 18, debarking drum sensor 20, discharge conveyor sensor 22, and chip feed conveyor sensor 24 are fed as inputs to programmable logic controller (PLC) 34. PLCs are well-known devices for use in process control applications in industrial plants. They are commercially available in many varieties, options including the number of inputs and outputs, processing speed, and logic complexity. In the preferred embodiment, PLC 34 is one of either Allen Bradley SLC-5 or PLC-5 models, manufactured by Rockwell Automation of Milwaukee, Wis. The PLC programming software used in the preferred embodiment is RSLogix 500, also available from Rockwell Automation. Many other models of PLCs and various types of programming software could be substituted in alternative embodiments.

PLC 34 generates output signals that are fed to infeed conveyor motor 26, debarker drum motor 28, discharge conveyor motor 30, and chip feed conveyor motor 32. These signals are used to stop, start, and vary the speed of these motors, and thereby control the operation of infeed conveyor 10, debarking drum 12, discharge conveyor 14, and chip feed conveyor 16. Specifically, according to the preferred embodiment infeed conveyor 10 may be turned on and off by control signals sent to infeed conveyor motor 26; debarker drum 12 may be set to high-speed rotation, low-speed rotation, or turned off by control signals sent to debarker drum motor 28; discharge conveyor 14 may be set to high-speed travel, low-speed travel, or turned off by control signals sent to discharge conveyor motor 30; and chip feed conveyor 16 may be set to high-speed travel, low-speed travel, or turned off by control signals sent to chip feed conveyor motor 32.

PLC 34 is also in communication with look-up tables 36. Look-up tables are logical constructs intended to store numbers in designated locations for easy look-up by PLC 34 when needed. Look-up tables 36 may be implemented in any electronic, magnetic, optical, or other computer-readable media. These tables may be read into a random access memory area of PLC 34 in order to be utilized. FIG. 3 shows the logical arrangement of three exemplary tables 40 according to a preferred embodiment of the invention. (It should be noted that the exemplary values shown in tables 40 do not necessarily represent optimal values for any particular wood variety or season.) The values in the tables 40 are used to control various parameters of the debarking system as will be explained in greater detail below. While three exemplary tables 40 are shown in FIG. 3, any number of tables 36 may be implemented in the preferred embodiment of the invention, according to the needs of the system. This will depend upon many factors; for example, the number of wood varieties processed at a particular mill. Personal computer 38 is used to input data to PLC 34, including the creation and deletion of tables 36, and the review and editing of the various values in tables 36.

Figure 4:
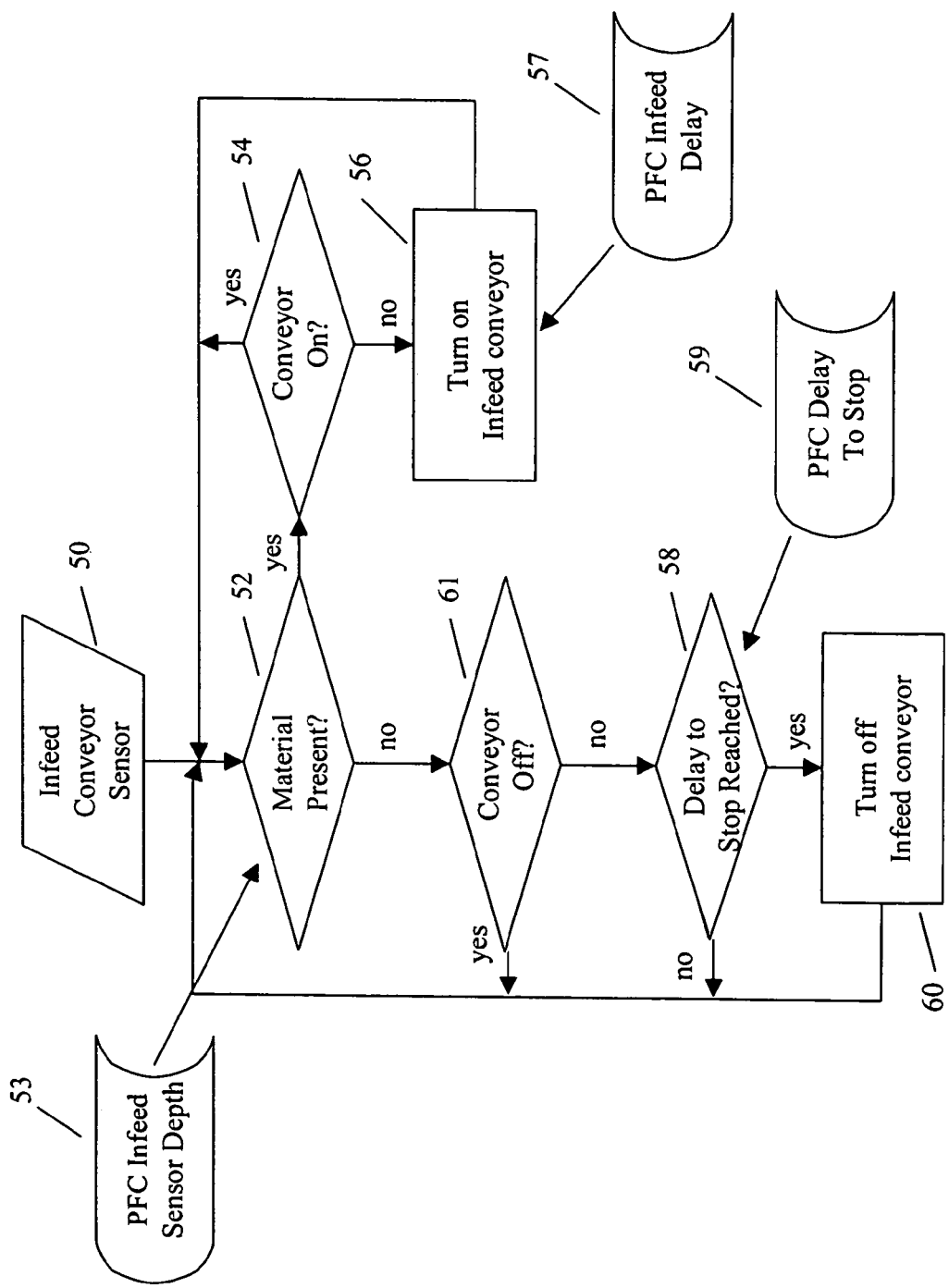
FIG. 4 is a flow chart illustrating the computational logic for controlling the infeed conveyor of a debarking apparatus according to a preferred embodiment of the present invention.

Referring now to FIG. 4, the computational logic implemented in PLC 34 to control infeed conveyor 10 according to a preferred embodiment of the invention may now be described. At input block 50, information from infeed conveyor sensor 18 is fed to decision block 52. This information will be in the form of a bed depth of material on infeed conveyor 10, preferably measured in inches. At decision block 52, the amount of material detected at infeed conveyor sensor 18 is compared to the "PFC infeed sensor depth" value at block 53, which is stored in the appropriate look-up table 36. If the quantity of material exceeds the value found in look-up table 36, then processing continues to decision block 54. At decision block 54, if infeed conveyor 10 is already on, then processing returns to decision block 52. If infeed conveyor 10 is currently off, then processing moves to process block 56. At process block 56, the infeed conveyor is turned on after a delay as designated in the "PFC infeed delay" value at block 57. This value is the number of seconds of delay after material is detected that infeed conveyor is to be turned on, and is stored in the appropriate look-up table 36. After completion of the process at process block 56, processing returns to decision block 52.

If a sufficient quantity of material is not detected at decision block 52, then processing moves to decision block 61. At decision block 61, the logic of PLC 34 inquires whether infeed conveyor 10 is currently stopped. If the answer is yes, then processing returns to decision block 52. If the answer is no, then processing continues to decision block 58. At decision block 58, the delay since the lack of material was first detected is compared to the "PFC delay to stop" value at block 59. Again, the "PFC delay to stop" value is stored in the appropriate table 36. If the delay time before stopping has not been reached, then processing is returned to decision block 52. If the delay time before stopping has been reached, then the conveyor is turned off at process block 60, and processing returns to decision block 52.

Figure 5:
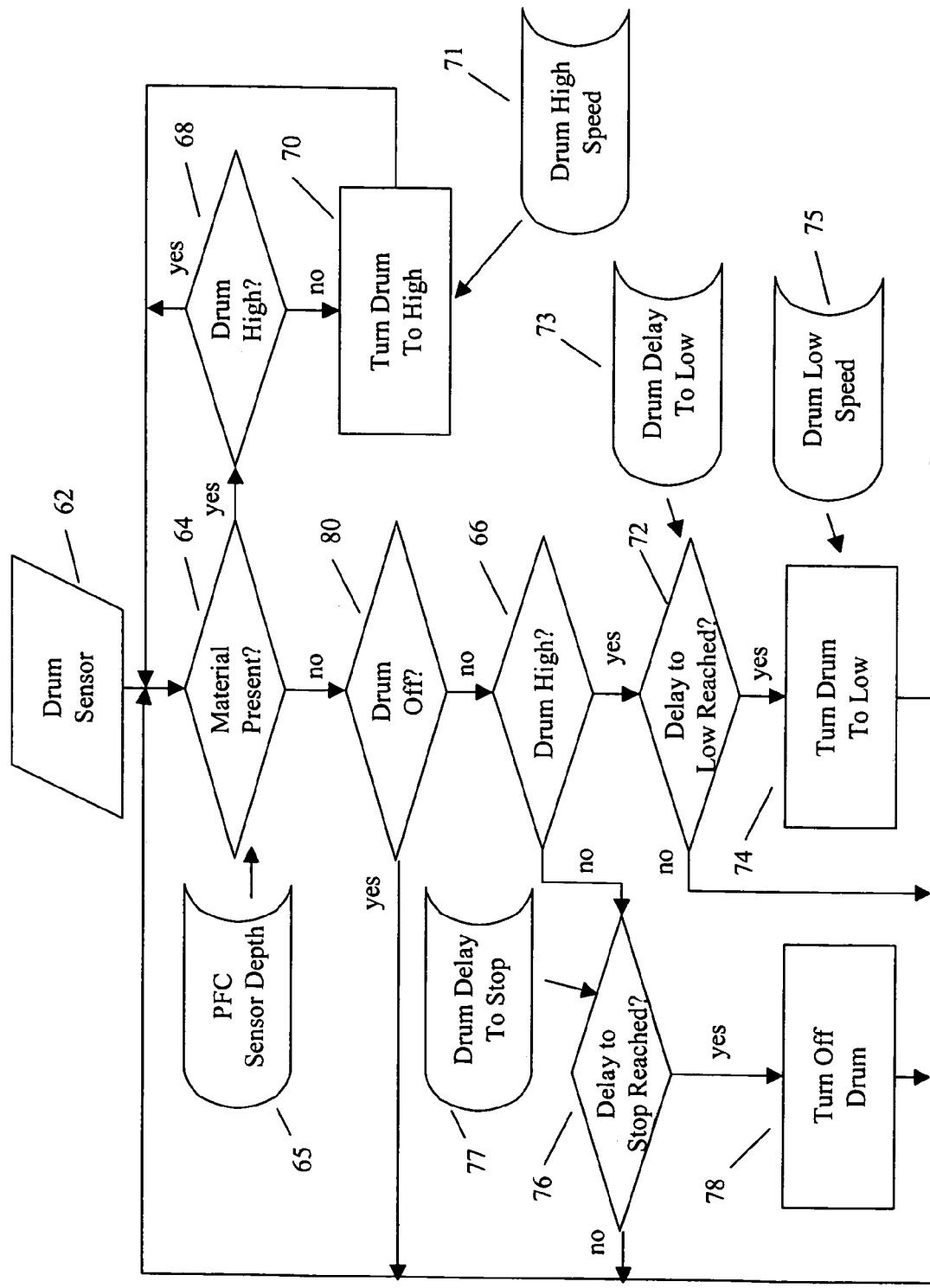
FIG. 5 is a flow chart illustrating the computational logic for controlling the debarking drum of a debarking apparatus according to a preferred embodiment of the present invention.

Referring now to FIG. 5, the computational logic implemented in PLC 34 to control debarking drum 12 according to a preferred embodiment of the invention may now be described. At input block 62, information from debarking drum sensor 20 is fed to decision block 64. As was the case for infeed conveyor sensor 18, this information will be in the form of a bed depth of material, preferably measured in inches, but in this case the measurement will be of material that is just approaching the entrance to debarking drum 12. At decision block 64, the amount of material detected that is about to enter debarking drum 12 is compared to the "PFC sensor depth" value at block 65, which is stored in the appropriate look-up table 36. If the quantity of material exceeds the value found in look-up table 36, then processing continues to decision block 68. At decision block 68, if debarking drum 12 is already on and running at high speed, then processing returns to decision block 64. If debarking drum 12 is currently off or running at low speed, then processing moves to process block 70. At process block 70, debarking drum 12 is turned to a high speed setting, the rotation per minute (RPM) value of which is designated in the "Drum fast speed" value at block 71. This value is stored in and is retrieved from the appropriate look-up table 36 by PLC 34. After completion of the process at process block 70, processing returns to decision block 64.

If a sufficient quantity of material is not detected at decision block 64, then processing moves to decision block 80. At decision block 80, the logic of PLC 34 inquires whether debarking drum 12 is currently stopped. If the answer is yes, then processing returns to decision block 64. If the answer is no, then processing continues to decision block 66. At decision block 66, the logic of PLC 34 inquires whether debarking drum 12 is currently running at its high-speed setting. If so, then processing moves to decision block 72. Here the logic of PLC 34 compares the delay since the lack of material was first detected with the "Drum delay to slow" value at block 73, which is stored in the appropriate table 36. If the delay time before returning to low speed has not been reached, then processing is returned to decision block 64. If the delay time before returning to low speed has been reached, then debarking drum 12 is turned to its low-speed setting at process block 74, and processing returns to decision block 64.

If at decision block 66 it is determined that debarking drum 12 is not currently running at its high-speed setting, then processing moves to decision block 76. At decision block 76, the logic of PLC 34 compares the delay since the lack of material was first detected to the "Drum delay to stop" value at block 77. Again, the "Drum delay to stop" value is stored in the appropriate table 36. If the delay time before stopping has not been reached, then processing is returned to decision block 64. If the delay time before stopping has been reached, then the conveyor is turned off at process block 78, and processing returns to decision block 64.

Figure 6:
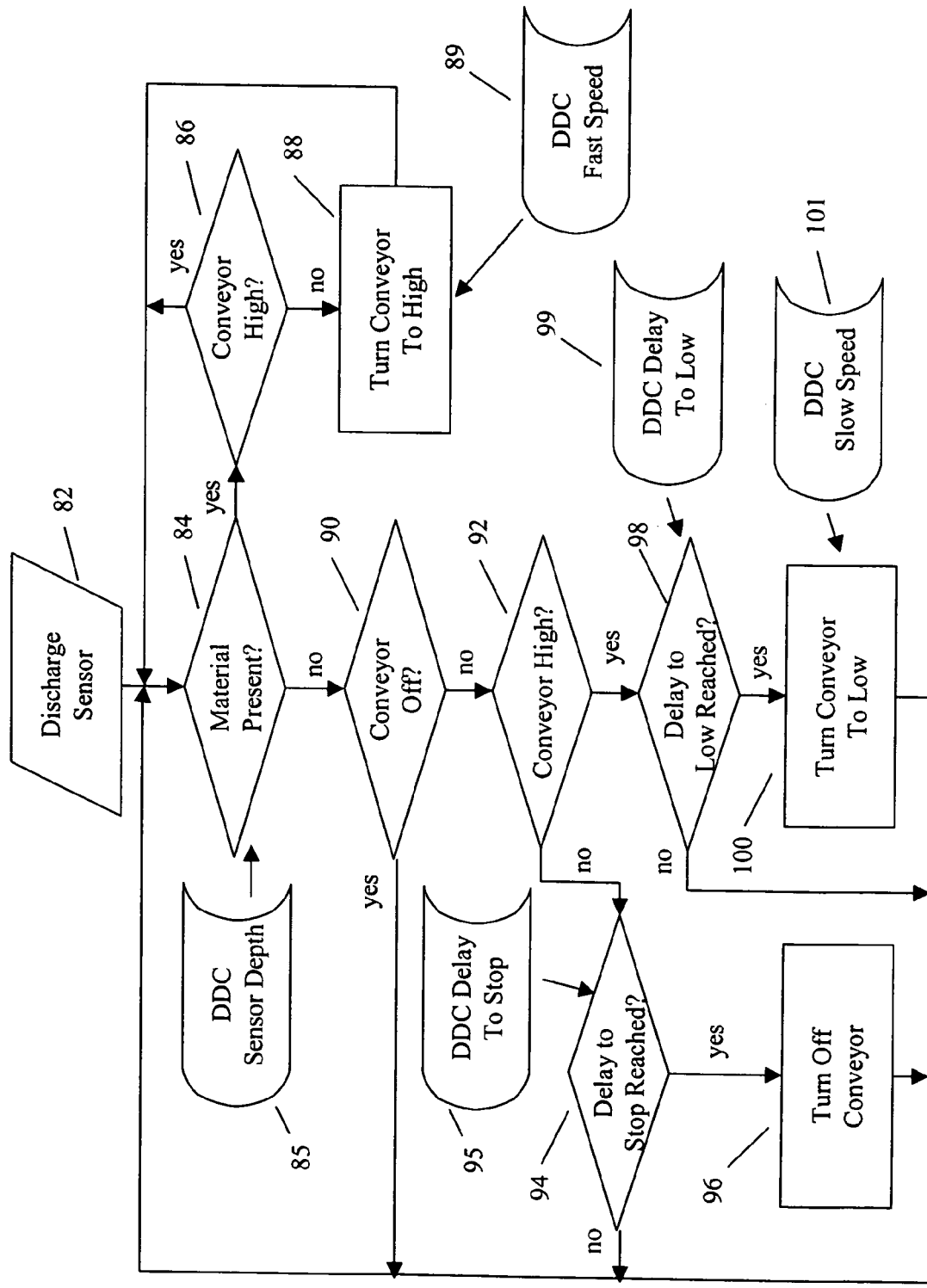
FIG. 6 is a flow chart illustrating the computational logic for controlling the discharge conveyor of a debarking apparatus according to a preferred embodiment of the present invention.

Referring now to FIG. 6, the computational logic implemented in PLC 34 to control discharge conveyor 14 according to a preferred embodiment of the present invention may now be described. Before automatic control begins, the operator generally sets discharge conveyor 14 to run at its low-speed setting using manual controls. Automatic processing them begins at input block 82, where information from discharge sensor 22 is fed to decision block 84. As was the case for infeed conveyor sensor 18 and debarker drum sensor 20, this information will be in the form of a bed depth of material, preferably measured in inches, but in this case the measurement will be of material that is just entering discharge conveyor 14. At decision block 84, the amount of material detected that is entering discharge conveyor 14 is compared to the "DDC sensor depth" value at block 85, which is stored in the appropriate look-up table 36. If the quantity of material exceeds the value found in look-up table 36, then processing continues to decision block 86. At decision block 86, if discharge conveyor 14 is already on and running at high speed, then processing returns to decision block 84. If discharge conveyor 14 is currently off or running at low speed, then processing moves to process block 88. At process block 88, discharge conveyor 14 is turned to a high-speed setting, the feet per minute value of which is designated in the "DDC fast speed" value at block 89. This value is stored in and is retrieved from the appropriate look-up table 36 by PLC 34. After completion of the process at process block 88, processing returns to decision block 84.

If a sufficient quantity of material is not detected at decision block 84, then processing moves to decision block 90. At decision block 90, the logic of PLC 34 inquires whether discharge conveyor 14 is currently stopped. If the answer is yes, then processing returns to decision block 84. If the answer is no, then processing continues to decision block 92. At decision block 92, the logic of PLC 34 inquires whether discharge conveyor 14 is currently running at its high-speed setting. If so, then processing moves to decision block 98. Here the logic of PLC 34 compares the delay since the lack of material was first detected with the "DDC delay to slow" value at block 99, which is stored in the appropriate table 36. If the delay time before returning to low speed has not been reached, then processing is returned to decision block 84. If the delay time before returning to low speed has been reached, then discharge conveyor 14 is turned to its low-speed setting at process block 100, and processing returns to decision block 84.

If at decision block 92 it is determined that discharge conveyor 14 is not currently running at its high-speed setting, then processing moves to decision block 94. At decision block 94, the logic of PLC 34 compares the delay since the lack of material was first detected to the "DDC delay to stop" value at block 95. Again, the "DDC delay to stop" value is stored in the appropriate table 36. If the delay time before stopping has not been reached, then processing is returned to decision block 84. If the delay time before stopping has been reached, then the conveyor is turned off at process block 96, and processing returns to decision block 84.

Figure 7:
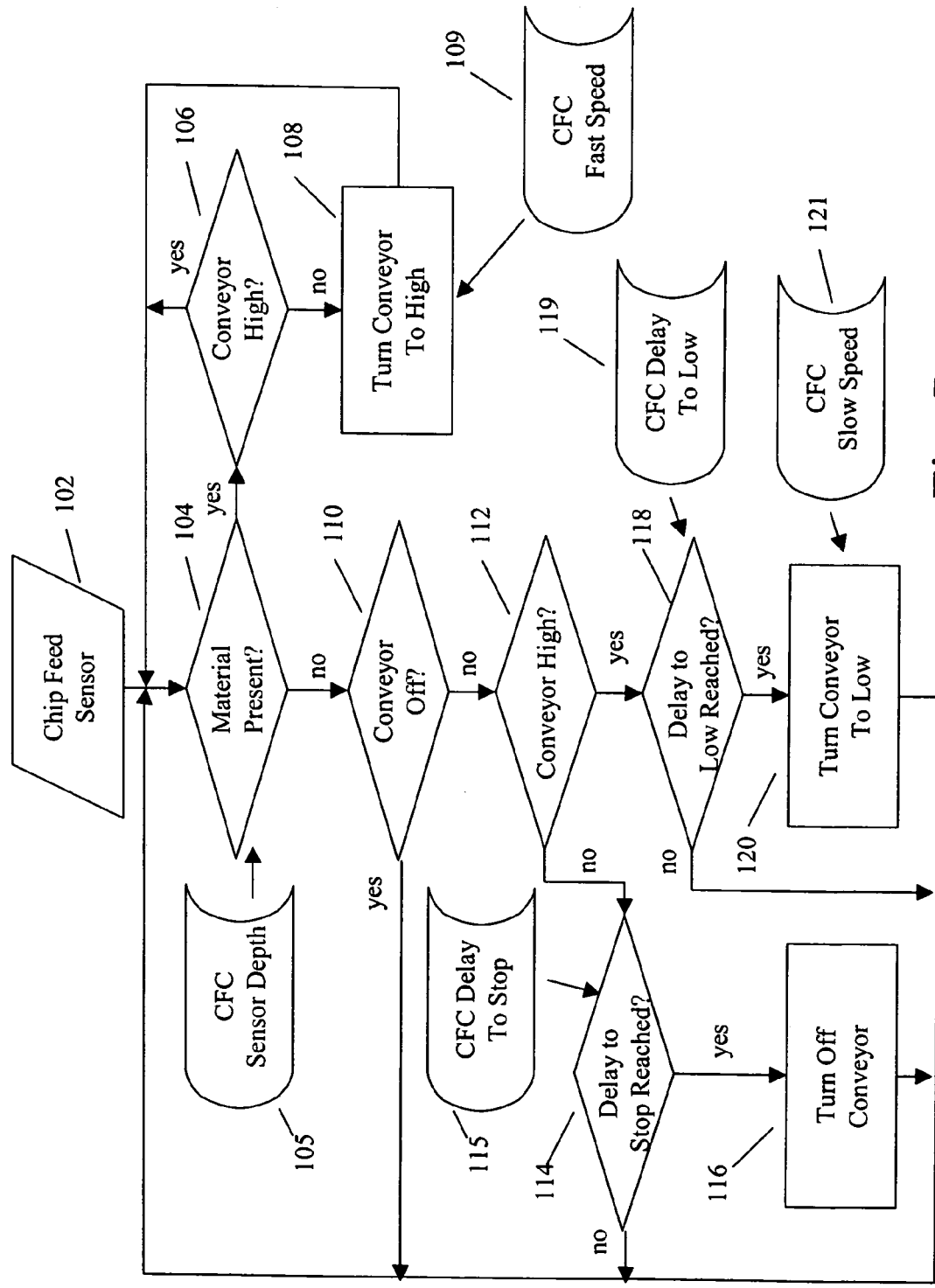
FIG. 7 is a flow chart illustrating the computational logic for controlling the chip feed conveyor of a debarking apparatus according to a preferred embodiment of the present invention.

Referring now to FIG. 7, the computational logic implemented in PLC 34 to control chip feed conveyor 16 according to a preferred embodiment of the present invention may now be described. Before automatic control begins, the operator generally sets chip feed conveyor 16 to run at its low-speed setting using manual controls. Automatic processing them begins at input block 102, where information from chip feed sensor 24 is fed to decision block 104. As was the case for infeed conveyor sensor 18, debarker drum sensor 20, and discharge conveyor sensor 22, this information will be in the form of a bed depth of material, preferably measured in inches, but in this case the measurement will be of material that is just entering chip feed conveyor 16. At decision block 104, the amount of material detected that is entering chip feed conveyor 16 is compared to the "CFC sensor depth" value at block 105, which is stored in the appropriate look-up table 36. If the quantity of material exceeds the value found in look-up table 36, then processing continues to decision block 106. At decision block 106, if chip feed conveyor 16 is already on and running at high speed, then processing returns to decision block 104. If chip feed conveyor 16 is currently off or running at low speed, then processing moves to process block 108. At process block 108, chip feed conveyor 16 is turned to a high-speed setting, the feet per minute value of which is designated in the "CFC fast speed" value at block 109. This value is stored in and is retrieved from the appropriate look-up table 36 by PLC 34. After completion of the process at process block 108, processing returns to decision block 104.

If a sufficient quantity of material is not detected at decision block 104, then processing moves to decision block 110.

At decision block 110, the logic of PLC 34 inquires whether chip feed conveyor 16 is currently stopped. If the answer is yes, then processing returns to decision block 104. If the answer is no, then processing continues to decision block 102. At decision block 102, the logic of PLC 34 inquires whether chip feed conveyor 16 is currently running at its high-speed setting. If so, then processing moves to decision block 118. Here the logic of PLC 34 compares the delay since the lack of material was first detected with the "CFC delay to slow" value at block 119, which is stored in the appropriate table 36. If the delay time before returning to low speed has not been reached, then processing is returned to decision block 104. If the delay time before returning to low speed has been reached, then chip feed conveyor 16 is turned to its low-speed setting at process block 120, and processing returns to decision block 104.

If at decision block 112 it is determined that chip feed conveyor 16 is not currently running at its high-speed setting, then processing moves to decision block 114. At decision block 114, the logic of PLC 34 compares the delay since the lack of material was first detected to the "CFC delay to stop" value at block 115. Again, the "CFC delay to stop" value is stored in the appropriate table 36. If the delay time before stopping has not been reached, then processing is returned to decision block 104. If the delay time before stopping has been reached, then the conveyor is turned off at process block 116, and processing returns to decision block 104.

Each of the delay times, speed settings, and material level settings associated with the operation of each component of the debarking system is stored in an appropriate table 36. Any number of tables 36 may be used in the preferred embodiment. Each table corresponds to a certain collection of settings that may be based on variables associated with the processing time of the material that is being run by the debarking apparatus. Such variables include, but are not necessarily limited to, the variety of the wood being processed and the season in which the wood is being processed. A different table may be assigned for operation of the debarking apparatus at any given time based upon these factors. The proper table to be used for a particular operating session may be chosen by the operator through computer 38. The values in each table 36 are determined empirically from actual operation of the debarking apparatus and from the programmer's experience with such systems. Once a particular table 36 is chosen, the system may be run without change of the chosen table 36 until a change in wood quality (such as wood variety or season) is determined to exist.

It should be noted that in the preferred embodiment, all of the controls for infeed conveyor motor 26, debarker drum motor 28, discharge conveyor motor 30, and chip feed conveyor 32 may be operated in a manual or override mode as necessary. As is evident from the above description of the control circuitry, the invention allows the debarking of material to be fed to a chip mill or other similar application to generally proceed with little human intervention. The invention saves energy and reduces component wear by slowing down or stopping those components that are not in use at any given time. For example, infeed conveyor 10 will be shut down after a period of time without use; debarker drum 12 will be slowed down after a period of time without use, and will be brought to a stop after an extended period of time without use; discharge conveyor 14 will be slowed down after a period of time without use, and will be brought to a stop after an extended period of time without use; and chip feed conveyor 16 will be slowed down after a period of time without use, and will be brought to a stop after an extended period of time without use.

It should be noted that while the preferred embodiment has been described, the invention also comprises a number of alternative embodiments. The debarking apparatus components with variable-speed drive systems, which could be any of the components as desired, could be controlled with any number of speed settings rather than the two of the preferred embodiment. Likewise, the speed of these components could be made continuously variable dependent upon a calculation based upon the quantity of material present. The present invention has been described with reference to certain preferred and alternative embodiments that are intended to be exemplary only and not limiting to the full scope of the present invention as set forth in the appended claims.

What is claimed is:

1. A method for controlling a debarking system, comprising the method steps of:
   (a) sensing one of the presence of material, the absence of material, and a level of material within the debarking system, and generating a sensor signal dependent thereupon;
   (b) receiving the sensor signal and calculating a location to access a control value in a look-up table based upon the sensor signal;
   (c) accessing the control value in the look-up table and calculating a control function based upon the control value;
   (d) sending a control signal to the debarking system based upon the control value.

2. The method of claim 1, further comprising the steps of:
   (a) receiving an operator signal indicating one of one or more of a variety of the wood being processed and the time at which the processing is being performed; and
   (b) calculating which of a plurality of look-up tables to access based upon one or more of the variety of wood being processed in the debarking system and the time at which the processing is being performed.

3. The method of claim 1, wherein said control value comprises one of conveyor delay to slow times, conveyor delay to stop times, drum delay to slow times, and drum delay to stop times.

4. A debarking control method, comprising the steps of:
   (a) sensing at an infeed conveyor positioned upstream from a debarking drum the presence of material to be debarked;
   (b) turning on an infeed conveyor motor driving the infeed conveyor if material is sensed at the infeed conveyor; and
   (c) turning off the infeed conveyor motor if no material is sensed at the infeed conveyor for a period of time, wherein an infeed delay value corresponding to the period of time is stored in an infeed delay value look-up table and accessed by a controller in communication with the infeed delay value look-up table and the infeed conveyor motor.

5. The debarking method of claim 4, further comprising the steps of:
   (a) sensing at the debarking drum at least one of the presence and quantity of material in the debarking drum;
   (b) turning a debarking drum motor driving the debarking drum to a higher speed if material is sensed in the debarking drum; and
   (c) turning the debarking drum motor driving the debarking drum to a lower speed if no material is sensed in the debarking drum for a period of time, wherein a drum delay to slow value corresponding to the period of time is stored in a drum delay to slow value look-up table and accessed by a controller in communication with the drum delay to slow value look-up table and the debarking drum motor.

6. The debarking method of claim 5, further comprising the step of turning the debarking drum motor off if no material is sensed in the debarking drum for a period of time, wherein a drum delay to stop value corresponding to the period of time is stored in a drum delay to stop look-up table and accessed by a controller in communication with the drum delay to stop look-up table and the debarking drum motor.

7. The debarking method of claim 5, further comprising the step of varying the speed of the debarking drum based on the quantity of material sensed in the debarking drum.

8. The debarking method of claim 6, further comprising the steps of:
 (a) sensing at a discharge conveyor positioned downstream of the debarking drum at least one of the presence and quantity of material in the debarking drum;
 (b) turning a discharge conveyor motor driving the discharge conveyor to a higher speed if material is sensed at the discharge conveyor; and
 (c) turning the discharge conveyor motor to a lower speed if no material is sensed in the discharge conveyor for a period of time, wherein a discharge conveyor delay to slow value corresponding to the period of time is stored in a discharge delay to slow value look-up table and accessed by a controller in communication with the discharge delay to slow value look-up table and the discharge conveyor motor.

9. The debarking method of claim 8, further comprising the step of turning the discharge conveyor motor off if no material is sensed at the discharge conveyor for a period of time, wherein a discharge conveyor delay to stop value corresponding to the period of time is stored in a discharge delay to stop look-up table and accessed by a controller in communication with the delay to stop look-up table and the discharge conveyor motor.

10. The debarking method of claim 8, further comprising the step of varying the speed of the discharge conveyor based on the quantity of material sensed in the discharge conveyor.

11. The debarking method of claim 9, further comprising the steps of:
 (a) sensing at a chip feed conveyor at least one of the presence and quantity of material in the chip feed conveyor;
 (b) turning a chip feed conveyor motor driving the chip feed conveyor to a higher speed if material is sensed at the chip feed conveyor; and
 (c) turning the chip feed conveyor motor to a lower speed if no material is sensed in the chip feed conveyor for a period of time, wherein a chip feed conveyor delay to slow value corresponding to the period of time is stored in a chip feed conveyor delay to slow value look-up table and accessed by a controller in communication with the chip feed conveyor delay to slow value look-up table and the chip feed conveyor motor.

12. The debarking method of claim 11, further comprising the step of turning the chip feed conveyor motor off if no material is sensed at the chip feed conveyor for a period of time, wherein a chip feed conveyor delay to stop value corresponding to the period of time is stored in a chip feed conveyor delay to stop value look-up table and accessed by a controller in communication with the chip feed conveyor delay to stop value table and the chip feed conveyor motor.

13. The debarking method of claim 11, further comprising the step of varying the speed of the chip feed conveyor based on the quantity of material sensed in the chip feed conveyor.

14. A method for controlling a debarking process, comprising the method steps of:
 (a) sensing at an infeed conveyor positioned upstream from a debarking drum at least one of the presence and quantity of material, and generating an infeed conveyor signal;
 (b) varying the speed of the infeed conveyor based on the infeed conveyor signal;
 (c) sensing at the debarking drum at least one of the presence and quantity of material, and generating a debarking drum signal;
 (d) varying the speed of rotation of the debarking drum based on the debarking drum signal;
 (e) sensing at a discharge conveyor positioned downstream from the debarking drum at least one of the presence and quantity of material, and generating a discharge conveyor signal; and
 (f) varying the speed of the discharge conveyor based on the discharge conveyor signal;
wherein a control value corresponding to each of the infeed conveyor signal, debarking drum signal, and discharge conveyor signal is stored in a look-up table and accessed by a control circuit to vary the speed of the infeed conveyor, debarking drum, and discharge conveyor, respectively.

15. The method of claim 14, further comprising the method steps of:
 (a) sensing at a chip feed conveyor at least one of the presence and quantity of material, and generating a chip feed conveyor signal; and
 (b) varying the speed of the chip feed conveyor based on the chip feed conveyor signal;
wherein a control value corresponding to the chip feed conveyor signal is stored in a look-up table and accessed by a control circuit to vary the speed of the chip feed conveyor.

16. The method of claim 15, further comprising the steps of:
 (a) receiving a material status signal indicating one of one or more of the variety of material being processed and the time at which the processing is being performed; and
 (b) calculating which of a plurality of look-up tables to access for each of the infeed conveyor signal, debarking drum signal, discharge conveyor signal, and chip feed conveyor signal based upon the material status signal.

* * * * *